United States Patent [19]

Hiriart Bodin et al.

[11] 4,312,801
[45] Jan. 26, 1982

[54] INTRODUCED IN PROCESSES FOR THE MANUFACTURE OF SILICON-BASED CURABLE COMPOSITIONS

[75] Inventors: Jean-Michel Hiriart Bodin; Jean-Claude Lahournere Irubetagoyena, both of St. Jean de Luz, France

[73] Assignee: Krafft, S.A., Andoain, Spain

[21] Appl. No.: 141,614

[22] Filed: Apr. 15, 1980

[30] Foreign Application Priority Data

Jan. 16, 1979 [ES] Spain ..................................... 476904

[51] Int. Cl.$^3$ ............................................... C08K 5/09
[52] U.S. Cl. ........................... 260/31.2 R; 260/31.8 S; 260/32.4; 260/32.6 R; 260/33.2 SB; 260/33.6 SB; 260/33.8 SB; 528/33; 528/34; 528/38; 528/41; 520/901
[58] Field of Search ................... 260/33.6 SB, 31.2 R, 260/32.4, 32.6 R, 33.2 SB, 33.8 SB, 31.8 S; 528/901, 33, 34, 41, 38

[56] References Cited

U.S. PATENT DOCUMENTS 4,164,617  8/1979  Van Kesteren .............. 260/33.6 SB Primary Examiner—Melvyn I. Marquis
Attorney, Agent, or Firm—Wenderoth, Lind & Ponack

[57] ABSTRACT

Silicon-based curable compositions containing a polysiloxane and an alkyl-aromatic compound, having a molecular weight greater than 200, which can be used to replace all or part of the non-reactive silicon fluids normally employed in preparing such compositions.

2 Claims, No Drawings

INTRODUCED IN PROCESSES FOR THE MANUFACTURE OF SILICON-BASED CURABLE COMPOSITIONS

The present invention relates to improvements in processes for the manufacture of curable compositions and more specifically to compositions which are cured with curable silicons when they contact the atmospheric water vapor, when the ingredients are mixed or when they are heated. The application of these improvements gives rise to a slight reduction in the manufacturing costs of the silicon-based curable compositions and to compositions having an optimum quality.

Silicon-based curable compositions, or more specifically organopolysiloxanes, basically comprise a polysiloxane containing reactive groups (for example silyl, silylol, alkoxy-silyl, etc. groups) having a vulcanizing agent (for example acetoxy-silanes, alkoxy-silanes, amino-silanes, ketoximes, vinyl siloxanes, peroxides, etc.) and an accelerating agent (for example tin salts). These compositions can be cured when they contact the atmospheric water vapor or when all the ingredients are mixed, or when they are subjected to heat.

To modify the characteristics of the curable compositions for the specific use thereof, non-reactive silicon fluids, such as $\alpha\text{-}\Omega\text{-trimethylpolydimethylsiloxanes}$, thixotropic agents, such as pyrogenic silica, mineral loads, pigments, etc. can be added.

Undoubtedly, due to the high cost of the polysiloxanes, the use of organic products in silicon-based compositions seems to be a very advantageous possibility. Such organic products can be used in complete or partial substitution of the non-reactive silicon fluids. However, the poor compatibility of the polysiloxanes with other chemical materials considerably limits the use in these compositions of siliceous-free organic products.

It should be pointed out that an attempt has been made to use organic substances, such as paraffin oil, adipates, polybutenes, polyisobutylenes, etc., in silicon-based curable compositions which vulcanize at room temperature or upon heating. Generally, these products present important defects with respect to the stability of the composition and they tend to produce exudation.

On the other hand, the organic substances heretofore used are not, in general, sufficiently compatible with polysiloxanes so as to permit transparent curable compositions to be manufactured.

However, the organic products which do not have these drawbacks, such as, for example, low molecular weight polybutenes, are too volatile and they are progressively eliminated from the cured composition, especially at temperatures above 50° C.

The present invention is based on the incorporation of organic products, such as alkyl-aromatic products, into polysiloxane-based compositions which can be cured at room temperature or by heating.

From the investigations made in this field, it has surprisingly been observed that these alkyl-aromatic products have an exceptionally good compatibility with polysiloxanes and can be incorporated in relatively high amounts in the curable compositions, without affecting the transparency or producing exudation.

In accordance with the invention, compositions of the alkyl-aromatic type having a molecular weight greater than 200 are used, in order to limit or eliminate the losses by evaporation when the curable compositions are subject to elevated room temperatures.

The mentioned alkyl-aromatic compounds do not intervene in the curing reaction of the polysiloxanes but they substitute, as previously mentioned for, the non-reactive silicon fluids normally used, modifying the characteristics of the cured compositions and controlling the elasticity, flexibility, gas permeability, etc. thereof.

The products of the alkyl-aromatic family having a molecular weight greater than 200, utilisable in obtaining the polysiloxane-based cured compositions, can pertain to the following groups:

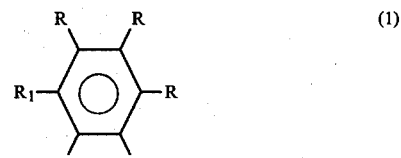

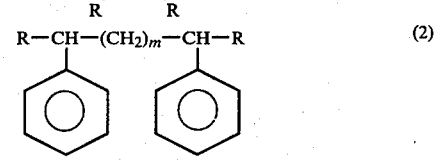

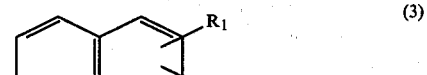

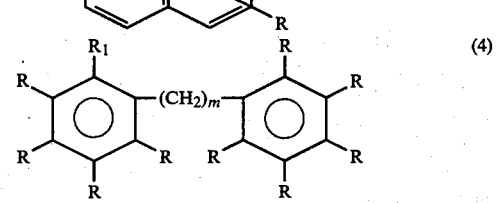

The R groups can be the same or different in the same molecule and can represent H and/or alkyl, alkenyl, halogen, haloalkyl, nitrile, amine, amide, ether or ester, etc. groups.

m should be equal to or greater than 1 but should not be greater than 25. $R_1$ is $C_nH_{2n+1}$, where n should be equal to or greater than 1 but should not be greater than 30.

In accordance with the invention, the polysiloxane-based curable compositions can contain one or more of the mentioned groups (1), (2), (3) and (4).

Monoalkylbenzenes having a molecular weight greater than 200, such as dodecylbenzene, pentadecylbenzene, dialkylbenzenes (such as didodecylbenzene), high molecular weight alkylates obtained in the manufacture of straight and/or branched dodecylbenzene containing monoalkylbenzenes and/or dialkylbenzenes and/or diphenylalkanes, can be cited as particularly advantageous components.

In accordance with the invention, polysiloxane-based compositions cured at room temperature or by heating can be modified with alkyl-aromatic compounds.

The mentioned modification is particularly advantageous in the following compositions containing basically:

polysiloxanes and a cross-linking agent and/or catalyst, which cures the composition in the presence of the water vapor;

Polysiloxanes and a vulcanizing agent and/or catalyst, which cures the composition when it is subjected to a high temperature; and Polysiloxanes and a cross-linking agent and/or catalyst, which cures the composition when all the ingredients are mixed.

These compositions can contain thixotropic agents and/or adhesive agents and/or mineral charges and/or pigments and/or solvents, etc. and can mainly be used as sealing, encapsulating, molding or coating masses.

The alkyl-aromatic compounds used should have a molecular weight greater than 200 and they should be used in amounts of from 5 to 100 parts per 100 parts of polysiloxanes.

The compositions thus obtained are characterized by a good stability during storage thereof. The process and the speed at which the composition is cured are not affected by the incorporation of the alkyl-aromatic products.

Once cured, the compositions do not have exudation or separation effects. The most outstanding feature of the invention resides in that it also permits translucid compositions to be manufactured.

The resistance to light, oxidation and microbiologic degradation of the compounds obtained can be improved, if necessary, by additives commonly used in the manufacture of rubber, plastics and adhesives.

The following examples represent the versatility of the invention:

EXAMPLE 1

A translucid composition, which will serve as a reference, is prepared in an anaerobic medium containing 45% of α-Ω-dihydroxypolydimethylsiloxane (known as silicon polymer), having a viscosity of 50,000 cst and 40% of α-Ω-trimethylpolydimethylsiloxane (known as silicon fluid) having a viscosity of 100 cst, 5% of acetoxy-silane and 10% of pyrogenic silica (BET surface 150). This composition can be stored in sealed containers and the curing process commences when the composition contacts the atmospheric water vapor.

The characteristics of these compositions, as well as those of Examples 2 and 3, are reflected in Table I.

EXAMPLE 2

A composition similar to that of Example 1 is prepared, using dodecylbenzene to replace the silicon fluid.

A transparent composition, which can readily be extruded and which has good stability when stored, is obtained.

EXAMPLE 3

A composition similar to that of Example 1 is prepared, containing 45% of silicon polymer, 20% of silicon fluid and 20% of alkylate having an average molecular weight of 330, obtained in the manufacture of dodecylbenzene and mainly containing diphenylalkanes and dialkylbenzenes, 5% of acetoxy-silane and 10% of pyrogenic silica (BET surface 150).

A translucid composition, which can readily be extruded and which has good stability when stored is obtained. Once cured, this composition has an excellent behaviour at elevated room temperatures, as can be seen in Table II.

TABLE I

Mechanical values of the cured composition

| | EX. 1 | EX. 2 | EX. 3 |
|---|---|---|---|
| $E_{100}$: Kg/cm$^2$ | 2.1 | 1.9 | 2.5 |
| $E_{300}$: Kg/cm$^2$ | 6.1 | 6.2 | 6.2 |
| Maximum strength Kg/cm$^2$ | 14.3 | 13.9 | 14.4 |

TABLE I-continued

Mechanical values of the cured composition

| | EX. 1 | EX. 2 | EX. 3 |
|---|---|---|---|
| Maximum Stretch | 650 | 550 | 605 |

TABLE II

Mechanical values of the composition of Example 3 before and after ageing on heating

| | Initial | After ageing 80° C. - 14 days |
|---|---|---|
| $E_{100}$: Kg/cm$^2$ | 2.5 | 2.6 |
| $E_{300}$: Kg/cm$^2$ | 6.2 | 6.2 |
| Maximum strength KG/cm$^2$ | 14.4 | 16.0 |
| Maximum stretch Kg/cm$^2$ | 605 | 670 |

EXAMPLE 4

A curable composition based on silicon having two components is prepared.

Component A contains 100 parts of α-Ω-dihydroxypolydimethylsiloxane, 20 parts of α-Ω-trimethylpolydimethylsiloxane, 20 parts of diatomaceous earth and, 10 parts of hydrophobic pyrogenic silica (surface coated with trimethylsilyl groups.

Component B contains 100 parts of ethyl polysilicate (40% SiO$_2$) and 2 parts of dibutyl-zinc dilaurate.

When components A and B are mixed in a proportion of 20:1, curing of the composition commences at room temperature. The characteristics of this composition are reflected in Table III.

EXAMPLE 5

A composition similar to that of Example 4 is prepared, the α-Ω-trimethylpolydimethylsiloxane of component A being substituted by an alkylate having an average molecular weight of 350 obtained in the manufacture of branched dodecylbenzene containing mainly dialkylbenzenes.

Curing of this composition commences at room temperature when components A and B are mixed in a proportion of 20:1. The characteristics of this composition are reflected in Table III.

TABLE III

| | EXAMPLE 4 | EXAMPLE 5 |
|---|---|---|
| 1. Gelling time | 4 h | 4 h |
| 2. Tensile strength-ASTM D 412 | | |
| $E_{100}$: Kg/cm$^2$ | 8.94 | 8.5 |
| Maximum strength Kg/cm$^2$ | 8.0 | 8.98 |
| Maximum stretch % | 200 | 200 |
| Hardness | 28 | 24 |

As can be seen in Table III, the characteristics of the composition are only slightly affected when the silicon fluid is substituted by the alkylate having a high molecular weight.

We claim:

1. A silicon-based curable composition comprising a polysiloxane and 5–100 parts, per 100 parts of the polysiloxane, of at least one alkyl-aromatic compound, having a molecular weight greater than 200, selected from the group consisting of compounds of the formulae:

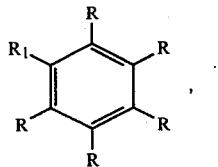

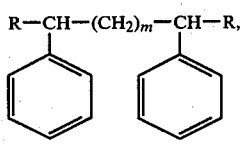

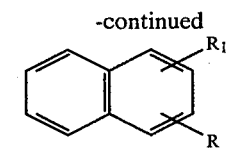

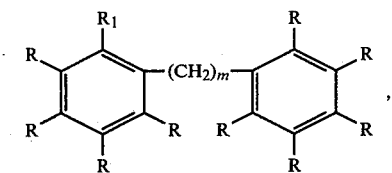

wherein each R, independently of each other R, is hydrogen, alkyl, alkenyl, halogen, haloalkyl, a nitrile group, an amine group, an amide group, an ether group or an ester group, m is an integer of from 1 to 25 and $R_1$ is $C_nH_{2n+1}$ where n is an integer of from 1 to 30.

2. A composition according to claim 1, wherein each R, independently of each other R, is hydrogen, alkyl, halogen, haloalkyl, a nitrile group, an amine group, an amide group, an ether group or an ester group.

* * * * *